United States Patent [19]

Schreiner

[11] Patent Number: 4,661,966

[45] Date of Patent: Apr. 28, 1987

[54] METHOD AND APPARATUS FOR ADJUSTING TRANSMISSION RATES IN DATA CHANNELS FOR USE IN SWITCHING SYSTEMS

[75] Inventor: Stanley M. Schreiner, Stamford, Conn.

[73] Assignee: T-Bar Incorporated, Wilton, Conn.

[21] Appl. No.: 777,021

[22] Filed: Sep. 17, 1985

[51] Int. Cl.$^4$ ............................................... H04L 7/04
[52] U.S. Cl. ..................................... 375/112; 370/61; 370/102; 375/118
[58] Field of Search .................. 370/58, 61, 102, 111; 375/106, 112, 118

[56] References Cited

U.S. PATENT DOCUMENTS

| | | | |
|---|---|---|---|
| 3,420,956 | 1/1969 | Heightley et al. | 370/102 |
| 4,053,715 | 10/1977 | Drapkin | 370/102 |
| 4,086,436 | 4/1978 | Cohen et al. | 370/102 |
| 4,424,473 | 9/1980 | Kaul et al. | 370/102 |

OTHER PUBLICATIONS

"Transmission Systems for Communications", Fourth Edition: Bell Telephone Laboratories, Inc., Feb., 1970, (pp. 608 through 621 of Chapter 26–Digital Multiplexers.

"Digital Transmission Systems", IEE Telecommunications Series 4; Revised 2nd Edition: P. Bylanski & D. G. W. Ingram, 1978.

Primary Examiner—Benedict V. Safourek
Attorney, Agent, or Firm—Dann, Dorfman, Herrell and Skillman

[57] ABSTRACT

Two data equipments are connected by switching equipment which supplies high speed lines for a modified data signal and a stuff control signal. A system clock or system clock derived signal is used in a stuffing pattern generator which generates a stuff control signal for one of the high speed lines. The stuffing pattern generator also controls the read terminal of a first buffer register receiving input data from a first equipment written into the register under the control of a clock generated from the system clock. The output from the first buffer register includes stuffing bits as well as data and the data and stuff signal is fed through a high speed line to a second buffer register. The write terminal of the second buffer register receives the stuff control signal to control input to the register and causes deletion of the stuff bits. The read terminal of the second buffer register is under control of the clock derived from the system clock to control the register output to the second equipment.

12 Claims, 6 Drawing Figures

"Modem Eliminator"

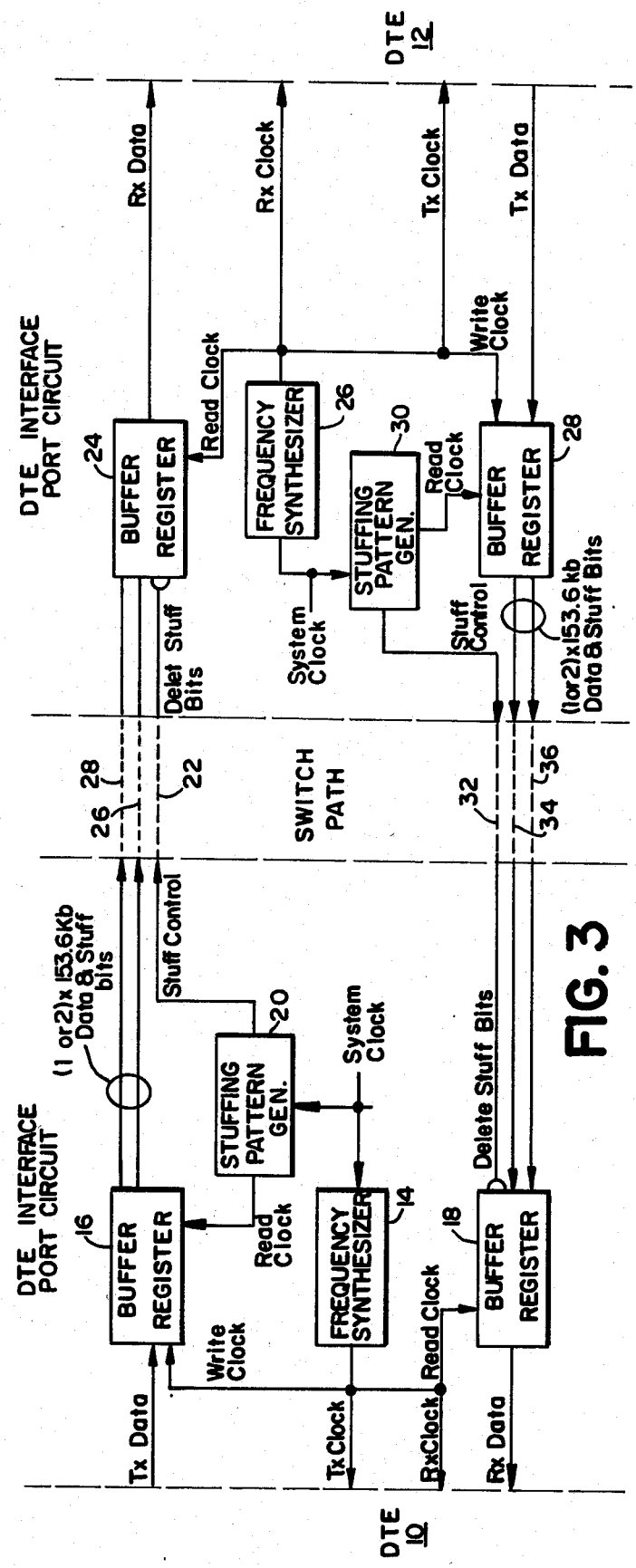

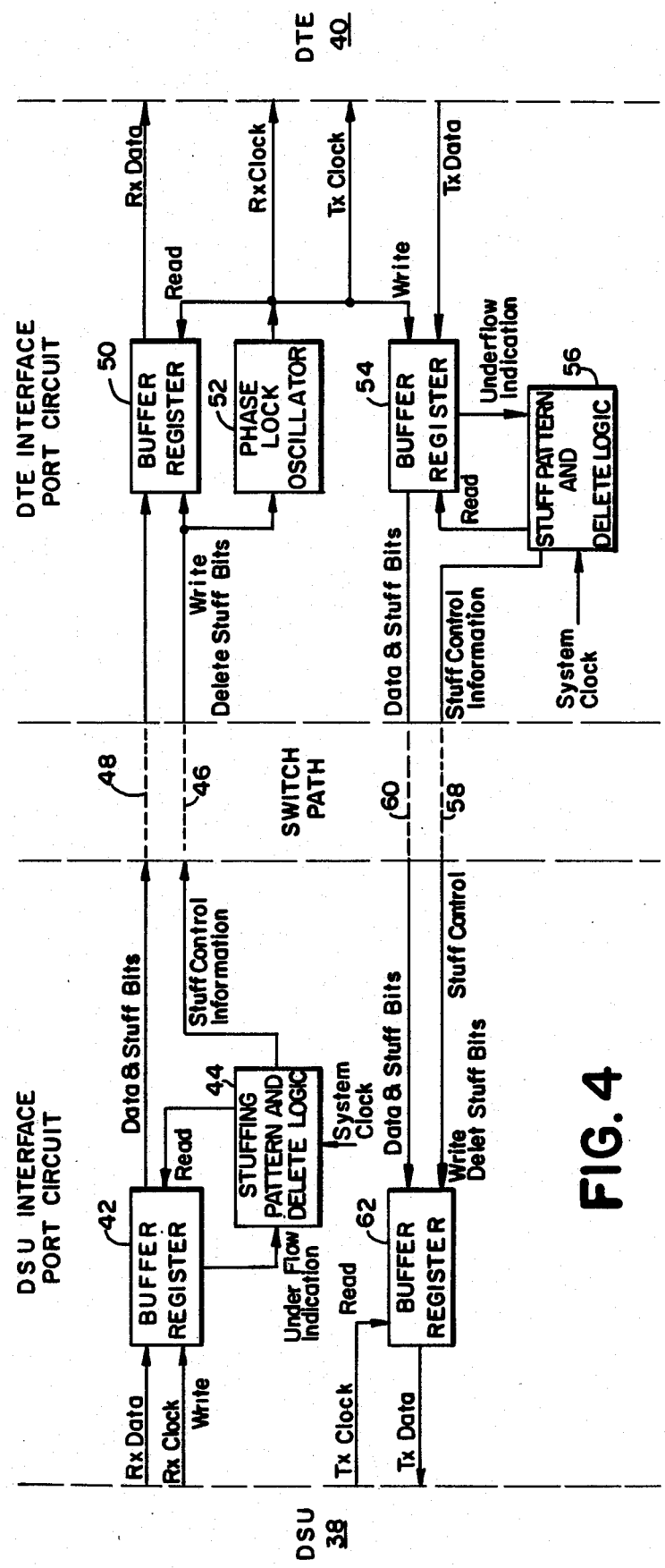

METHOD AND APPARATUS FOR ADJUSTING TRANSMISSION RATES IN DATA CHANNELS FOR USE IN SWITCHING SYSTEMS

The present invention relates to a means of modifying in switching equipment data signals so that they may be carried on higher speed transmission lines between certain kinds of data equipments. This is possible in situations where a common system clock is available to the interfaces of the equipment so that clock signals need not be transmitted and the clock transmission lines are left available for transmitting data stuffing information.

BACKGROUND OF THE INVENTION

In the prior art in certain instances, it has been possible to use the technique known as "pulse stuffing" to allow either a gap or a meaningless signal to be "stuffed" into a data train at periodic intervals in order to increase the apparent data rate of the signal so that it may be carried on higher data rate digital transmission lines without effectively increasing the data. This involes inserting the meaningless signal at the transmit end of a transmission line and providing a stuff control code which indicates where that meaningless signal is on the data line relative to real data on the line. For example, the stuff control code might provide pulses, or digital ones, when the data is on the line and no pulses, or digital zeros, when the stuffed information is on the line. This code permits removal of the stuffed information at the other end of the data line by deleting from the received signal the meaningless portion as indicated by the stuff control code which is transmitted separately from the data.

The prior art has used this technique for multiplexing a plurality of digital signals which are not synchronous into a higher speed digital signal for transmission over a single transmission facility.

Techniques Used in High Data Rate Switching

In modern data switching systems which are used to interconnect a plurality of DTE equipments to a plurality of DCE equipments and also in some case also to interconnect DTE equipments or DCE equipments, time division switching techniques are often employed. In order to preserve the fidelity of the data and clock signals and their relative phase relationship, it is necessary to transmit, through the switch network, many samples per data bit, typically eight or more. The control signals which do not require as precise accuracy of reproduction in time may be sampled at a lower rate as in the system disclosed in "Matrix Switching System", U.S. patent application Ser. No. 775,634, filed Sept. 13, 1985, although in many time division switching systems all signals are sampled at the same rate.

To provide a switching system which is transparent to input data rate such that the user may connect any data source regardless of speed to any port of the switch (although connections are only used between ports of like speed), it is customary in time division switching systems to provide a sampling rate which is adequate for the highest data rate to be normally handled. Thus, for a system to be used primarily with RS-232 signals having a maximum data rate of 19.2 kb/s, a sampling rate of 153.6 kb/s ($8 \times 19.2$ kb) might be chosen. This allows the user to connect any data source from 75 bps to 19.2 kb/s without adjustment. Space division systems using relay contacts or semi-conductor equivalents, e.g., CMOS or FET switches, are inherently transparent to data rates up to the maximum bandwidth of the system and, therefore, do not require special techniques for handling any data rate up to the maximum that the particular design is capable of transmitting.

With the increasing trend towards the use of higher speed data transmission facilities, data rates in excess of 19.2 kb/s are being used. These rates are often related to the standard PCM voice rates of $8000 \times n$-(i.e., 56 kb/s, 64 kb/s, or 256 kb/s) rather than the $75 \times 2^n$-(i.e., 1200, 2400, 4800, 9600, 19,200 bps) series traditionally used for low and medium speed data. Other data rates sometimes used are 57.6 kb/s and 230.4 kb/s which are 1.5 times a rate in the $75 \times 2^n$ series.

To adapt ports in a time division switching system, designed primarily to handle data rates up to 19.2 kb/s, to these higher data rates the usual practice is to assign several equally spaced time slots to the higher speed ports. For example, the multiplex buses in a time division switching network might normally provide a frame of 64 time slots, allowing 64 connection paths for 19.2 kb/s data. By assigning, in the path search algorithm, four equally spaced time slots for a high speed data connection (e.g., time slots 0, 16, 32, 48, or 1, 17, 33, 49, etc.) data rates up to 76.8 kb/s may be switched with the same relative fidelity as normal connections of 19.2 kb/s which use one sample per frame. The penalty paid for this increased number of time slots is a reduction in the effective number of switch paths and, therefore, in the number of ports which may be equipped in a given switch structure. In one example a switch structure designed to accommodate ten port groups with 32 ports per group at 19.2 kb/s could only accommodate eight ports in a group equipped with ports to handle data rates up to 76.8 kb/s, or two ports in a group equipped with ports to handle data rates up to 307.2 kb/s. A reduction in total capacity from 320 ports to 80 ports to 20 ports, Further, even if only a few higher speed ports are equipped, each 76.8 kb/s port displaces four low speed ports while each 307.2 kb/s port displaces sixteen low speed ports. The cost effectiveness of the switching network is reduced significantly by this reduction in capacity.

The Nature of the Present Invention

In the general case the data rate is dependent on the DCE and may vary over some range of tolerance and, furthermore, transmit and receive clocks are independent and may each be different within the range of tolerance. However, there are some applications where advantage may be taken of specific characteristics of the nature of the clock signals of the interface connection to make use of the techniques of pulse stuffing. One of these is the interconnection between two DTE's.

In applications of interconnected DTE's to date, although the clock supplied by the switch may be derived from the internal clock of the switch, it has been a sub-multiple of the switch clock and, therefore, the full capacity of the internal switch path has not been used. For example, although the internal switch path may transfer 153.6 kb/s, the data rate clock and therefore the actual data rate may still be only 19.2 kb/s.

In accordance with the present invention in interconnected DTE's, since the data rate clock does not have to be transferred through the switch, the high speed lines normally used for clock signals may instead be used for data providing a capacity of two, three or more times the normal switch path. By this means, in the example given above, data rates of 153.6 kb/s, 307.2 kb/s, etc. may be transferred using no more switch capacity than is required for a normal 19.2 kb/s connection. Exact sub-multiples of the above rates such as 76.8 kb ($\frac{1}{2} \times$ 153.6 kb/s) may also be transferred by simple techniques.

The application of pulse stuffing techniques provides a much more flexible choice of data rates. DTE equipment may be designed to work at other rates than those given above or may be limited, by hardware or software technology, to maximum rates for example of 64 kb/s or 256 kb/s and would be used inefficiently at substantially lower rates which would be directly available from the switch clock. In this case, where the optimum data rates to be transmitted are rational fractions of the data rates of the switch path, a fixed stuffing pattern may be established to increase the data rate to match the transmission rate. Assuming that these rates are compatible, however, it is still a problem to transmit the stuffing control information because it must also be transmitted on a high speed line.

Another application of pulse stuffing occurs when the transmit clock and receive clock provided by the DCE can be assured to be the same frequency. This is the case when the DCE equipment is a DSU (Data Service Unit) used to interface transmission facilities provided by the Digital Data Network, but might also be the case for other types of DCE. The DSU, because it interfaces a digital network which operates at a fixed data rate, must derive its clock signals from the network data rate. In this case, it is not necessary that there be an exact relationship between the switch clock and the data rate. Instead, the techniques of pulse stuffing used for multiplexing asynchronous digital streams may be used to provide a variable stuffing rate to adapt the input data rate to the rate of the switch path. Instead of providing a DCE port circuit which is transparent to data rate, a DSU port circuit may be designed to operate at one or several specific data rates. The variable stuffing control information may be used in the connected DTE port circuit to recover the average data rate clock to be supplied to the DTE.

In the above cases, by applying the techniques of pulse stuffing, it is possible to transfer data rates significantly in excess of the normal 19.2 kb/s rate of the switching system with no reduction in the number of ports or connection paths.

The apparatus of the present invention comprises a switch system for interconnecting first and second data handling equipments where the equipments to be connected can operate from a common system clock which does not require a separate high speed transmission line. The transmission line normally dedicated to the clock then carries a stuff control code. Thus, the system requires means giving access to a system clock at at least one of the interfaces such that a common clock is available at both. A stuffing pattern generator outputs a stuff control signal on one of the high speed lines. An output buffer register at one of the inputs allows adjustment of data rate relative to data input from a first equipment having a write terminal triggered by a clock signal derived from the system clock permitting input from the first equipment and a read clock terminal operated by the stuffing pulse generator allowing output of data and stuff bits onto a second high speed line from the buffer register. An input buffer register in the second equipment interface receives the data and stuff bits from the second high speed line. The stuff control signal triggers input write terminal to respond to valid data and delete the stuffing. The receiving buffer register passes the data out to the receiver at a rate determined by the write trigger operated by a clock derived from the system clock.

The method in accordance with the present invention relates to modifying bit frequency in data switches between first and second data equipments on one or more transmission lines where the data rate is a rational fraction of the transmission path rate in an equipment switching system or in an application where the data rate is less than the transmission path rate but the transmit and receive data rate clocks supplied from the data communication equipment are the same frequency derived from the same source. The data to be transmitted is received from the first equipment in a buffer register. A stuff control signal for transmission on a separate high speed line from the data is generated in response to a system clock common to the equipments to be connected. The stuff control signal is then used to trigger the buffer register to allow passage of data bits only during a period coded for transmitting data. At the second equipment interface, the stuff control signal is used to delete all signal information during the stuff period and retain only valid data. Then, the original frequency of the data bit information is restored before the data is supplied to the second equipment.

SPECIFIC EMBODIMENTS OF THE PRESENT INVENTION

For a better understanding of the present invention, reference is made to the accompanying drawings in which:

FIG. 3 is a block diagram schematically showing a portion of a switching system interconnecting two DTE interfaces;

FIG. 3a is an example of the transfer signal through the switch path in the circuit of FIG. 3;

FIG. 4 is a block diagram schematically showing a portion of a switch system in accordance with the present invention interconnecting a DSU and DTE interface; and FIG. 4a is a chart showing an example of a transferred signal through the switch paths of FIG. 4.

Figure 1:
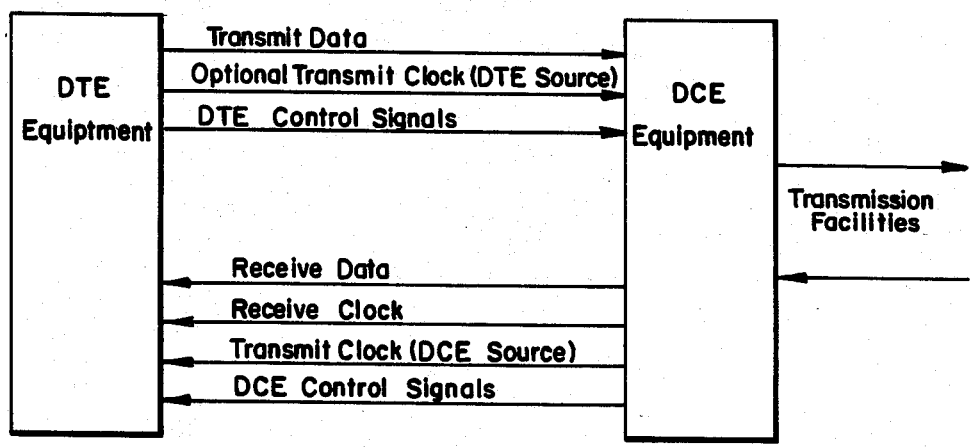
FIG. 1 is a block diagram showing conventional interconnection of DTE and DCE equipment.

FIG. 1 represents the present standard digital data interface used between DTE (Data Terminal Equipment) and DCE (Data Communication Equipment) such as the familiar EIA RS-232C or CCITT V.35, a plurality of signals are provided. These consist of Transmit Data, Receive Data, Transmit Clock (DCE Source), Receive Clock (DCE Source), optionally Transmit Clock (DTE Source) and a plurality of control leads in both directions. These signal connections are illustrated in FIG. 1 which indicates the direction of the various signals.

Figure 2:
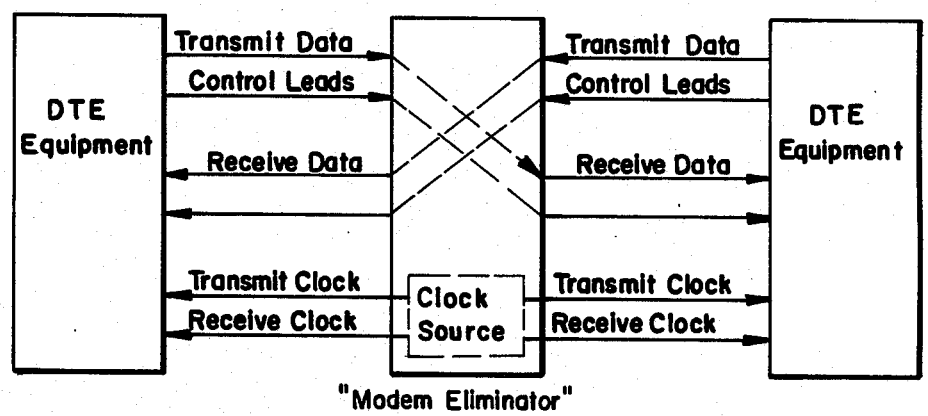
FIG. 2 is a block diagram showing a modem eliminator system for use in interconnecting two DTE equipments.

FIG. 2 illustrates a standard interconnection between two DTE's. In this case, since there is no DCE to provide clock signals, the customary practice when DTE's are directly connected is to use a "modem eliminator" which provides the function of cross-over of signals so that transmit data from one DTE becomes Receive Data for the other DTE, and vice versa, and also provides clock signals to the two DTE's. When this connection is established via a switching system, the switch may provide the signal cross-over and clock signals.

Since the present invention has to do with using the limited lines available for high speed transmission within a switch path, the nature of that switch path should be considered. The preferred switch path for the present invention is disclosed in "Matrix Switching System", U.S. patent application Ser. No. 775,634, filed Sept. 13, 1985. FIG. 8 of that application suggests a central matrix 64×64 with 64 port groups of 32 ports each. FIG. 9 of that disclosure shows a frame structure of 64 time slots which is used on the multiplex highways of FIG. 8 to provide non-blocking inter-connection paths for a group of 32 ports as required for a three-stage network configuration. The principal involved is equally applicable to the case of a single-stage network, e.g., where only 32 time slots are required for non-blocking inter-connection.

In order to configure a port capable of handling data at higher rates, multiple time slots must be assigned to a connection and these time slots must be equally spaced to maintain the same fidelity of reproduction of data signals. For example, a port to be used for data rates of up to four times the normal rate would require four equally spaced time slots and would displace four lower speed ports. Furthermore, to maintain the conditions for strict non-blocking without re-arranging existing connections, it is necessary that an entire port group be devoted to high speed data signals even though only a few ports might be required.

Therefore, the reason to provide another technique to handle higher speed data without the penalty of reduced switch capacity is very understandable. In accordance with the present invention, the techniques of pulse stuffing can be used in two principle classes of connections where specific fixed data rates are used, and where the switch path normally used as a clock path may instead be used to transfer the stuffing control signals. One is a DTE to DTE interface, and the other is a connection of DSU (Data Service Unit), or similar DCE where the transmit and receive clock are derived from the same frequency source, to a DTE.

Referring now to FIG. 3, the two DTE interfaces, generally designated 10 and 12, have data signals that enter and leave. DTE 10 has a transmit data signal ($T_x$ Data) which is sent out from the interface in response to (or in synchronization with) the $T_x$ clock which it receives from the interface circuit. It receives the $T_x$ (transmit) clock which is generated from the system clock which is also the $R_x$ (receive) clock which it receives. It also receives $R_x$ (receive) data. DTE interface 12 receives the data transmitted by interface 10, and, in turn, transmits the data which is received by interface 10. It also has a $R_x$ (receive) and $T_x$ (transmit) clock generated from the system clock and $T_x$ data input to the interface. The system clock is common to the entire system and may be transmitted by a separate individual cable from one piece of equipment to another and is the means of synchronizing the system. The frequency synthesizer 14 may use well know techniques of binary rate multipliers and dividers or it may use the well know techniques of phase locked loop frequency synthesizers to generate the desired data rate clock from the system clock provided that there is an exact rational fracitonal relationship between the data rate clock and the system clock. The $T_x$ and $R_x$ clock signals generated by frequency synthesizer 14 are input to the DTE interface 10 and provide a write clock signal to a trigger terminal of transmit buffer register 16. Frequency synthesizer 14 similarly provides a read clock to trigger an output from receive buffer register 18. The system clock is also the principle input to the stuffing pattern generator 20 which generates a stuffing pattern shown as a stuff control signal in FIG. 1a and may be simply a digital signal which shows the presence of real data with a one and stuffed bits with 0. The stuff control signal is output onto a high speed lead 22 which is fed to the receive buffer register 24 at the DTE interface 12. The stuffing pattern generator 20 also generates a read clock which, effectively, triggers the buffer register 16 to send out bits at times corresponding to data signal positions and witholds the data at other times. In this case, there are two high speed lines transmitting data, although it will be understood that there could be just one as indicated by the note on leads 26 and 28. The stuff control signal on line 22 will act on the output buffer register 24 to cause deletion of any bits occurring during the stuff period (S in FIG. 3a) from the high speed signals entering the buffer register 24 from lines 26 and 28 so that the only signal available to leave the buffer register 24 is genuine data (D in FIG. 3a). How the data leaves to enter DTE 12 is a function for the buffer register set up, but this is controlled as to when each successive bit leaves by read clock. Again, the clock signal is derived from the system clock by the frequency synthesizer 26 which provides the identical functions as frequency synthesizer 14. The same source is responsible for supplying both $R_x$ (receive) and $T_x$ (transmit) clocks to the DTE 12 and write clock pulses to the transmit buffer register 28.

Register 28 corresponds in structure and function to buffer register 16. Buffer register 28, of course, receives its input data from DTE 12. The data enters the buffer register under control of write clock which also provides $T_x$ clock to DTE 12 to trigger the output $T_x$ data. Data leaves the buffer subject to a read clock generated by stuffing pattern generator 30 which generates a stuff control signal of the type shown in FIG. 3a which is transmitted then by line 32 to receive buffer register 18. Data passing the transmit buffer register 28 exits on high speed lines 34, 36 to travel to buffer register 18. At buffer register 18 the delete stuff bits signal eliminates any non-data signal so that again only data passes through the buffer register. The data output from buffer register 18 is controlled by the read clock, derived by the same system clock through frequency synthesizer 14 to output the received data to DTE interface 10.

The following is a table showing relationship of data rates and the rate of transmission in paths and the rational fraction that defines the relationship to provide the fixed stuffing pattern generated by stuffing pattern generators 20 and 30:

| Data Rate | Transmission Path | Stuffing Pattern (Databits: Total bits) |
|---|---|---|
| 256 kb | 2 × 153.6 kb | 10:12 |
| 230.4 kb | 2 × 153.6 kb | 6:8 |
| 64 kb | 1 × 153.6 kb | 5:12 |
| 57.6 kb | 1 × 153.6 kb | 3:8 |
| 56 kb | 1 × 153.6 kb | 35:96 or (7:8) × (5:12) |

This is for the particular case where the switch path is 153.6 kb for handling normal ports of 19.2 kb with 8 samples per bit.

It should be noted there will always be a rational fraction relationship for cases where switch transfer rate is chosen to be in the standard data rate series $75 \times 2^n$, i.e., 2400, 4800, ... 153.6 k and data rates are related to PCM rates $8000 \times n$, i.e., 56 kb, 64 kb, etc., because there is a common denominator 1600, i.e., $8000/9600 = 5 \times 1600/6 \times 1600$. It also includes cases where the data transfer rates used are $\frac{3}{4}$ of the next higher rate in the standard $75 \times 2^n$ series, i.e., 57.6 k = $\frac{3}{4} \times 76.8$ k and 230.4 k = $\frac{3}{4} \times 307.2$ k.

The system of FIG. 4 is similar to that of FIG. 3 in that it is controlled by a common system clock, and, in this particular illustration, it shows a single data path for each direction between the two units. Here, a DSU is generally designated 38 and the DTE generally designated 40. In this case, however, the input to buffer register 42 is controlled by the $R_x$ (receiver) clock which triggers the write terminal of the buffer register allowing the received data signal to pass into the buffer register at regular sequenced intervals. In this case, the stuffing pattern generator 44, which is operated by the system clock also, requires some delete logic which may modify the stuffing pattern. In the event that underflow from the buffer register occurs due to the fact that the output rate controlled by read clock from stuffing pattern generator 44 exceeds the input data rate, the data requires extra space so that a stuff control one in the signal shown in FIG. 4a may be turned into a zero to permit a stuff bit instead of real data to be passed by the trigger at the read terminal of the buffer register. The stuff control signal passes on high speed line 46. The data and stuffed bits pass on high speed line 48 to the buffer register 50 controlling the receive data input to DTE 40. The rate at which the buffer reads out is controlled by the $R_x$ (receive) clock signal which comes from phased locked oscillator 52 applied to the read terminal of buffer 50. This signal is derived from the stuff control signal which from line 46 feeds phase lock oscillator 52. The phase locked oscillator acts as a filter to derive a smooth clock signal from the stuff control signal generated in stuff pattern generator and delete logic 44. This clock signal corresponds to the average frequency of the stuff control signal 46 and therefore is the same frequency as the $R_x$ clock and $R_x$ data rate input to buffer register 42. The output of the phase locked oscillator provides all the clock signals needed for the DTE which includes the transmit as well as the receive clock. Thus, these clocks are the same frequency as the $R_x$ clock coming from DSU 38. Since, in the case of a DSU the transmit clock from the DSU is also the same frequency as the $R_x$ clock, although not necessarily the same phase, this clock signal may be used to provide $T_x$ clock to DTE 40 to trigger data output from DTE 40 at the proper rate for transmission to the DSU. The same clock acts as a write trigger for the buffer register 54 which receives a transmit data signal from DTE 40. Again, this buffer register is similar to register 42. An underflow identification is fed to stuffing pattern generator and delete logic 56 corresponding to system 44 on the DSU side. As before, the system clock is used as the output trigger to allow the stuffing pattern to be transmitted on the stuff control lead 58. The same signal acts as a read trigger for the buffer register to output data and stuff bits on line 60. As in the DSU side, the stuff control in this case may be modified where the data out underflows the buffer capacity, and the buffer register outputs a stuff bit instead of a valid data bit. The stuff control signal on line 58 acts as the write trigger in the receive buffer register 62 deleting the stuff bits and allowing only data to pass. A phase locked loop is not required in this direction since the transmit clock supplied by the DSU is at the proper data rate. The transmit clock acts as the read trigger to the buffer register allowing output of transmit data to the DSU 38 at the original input frequency.

The system of FIG. 4 has been described in terms of positive pulse stuffing, also called positive justification, where read out from the buffer register 42 is nominally at a higher rate than the input data rate and stuff bits are added to adjust the output data rate to the input rate of the buffer. However, it is understood that the system is general and may also be applied to the case of negative pulse stuffing where the input rate is faster than the output rate and overflow data bits are transmitted over an additional channel, or the same system may also be applied to the case of positive/negative pulse stuffing.

The last case of positive/negative pulse stuffing, in particular, can have significant advantages in implementation of the phase locked oscillator. The nominal output rate from the stuff pattern generator may be designed to be the same as the nominal data rate by the techniques described in the description of FIG. 3. The difference frequency, which must be compensated for by variable rate stuffing, would then only be the difference in tolerance from nominal frequency of the two clock systems which typically have a tolerance of ±50 parts per million each. The jitter components due to this variable rate would then be the components which must be filtered out by the phase locked oscillator.

The stuff control channel, in this latter case, could then transmit over lead 46, for example, a specific code pattern to identify to buffer register 50 either a stuff bit or an overflow bit and if an overflow bit whether the overflow bit to be inserted is a zero or a one. Since positive or negative stuffing would occur infrequently, the code pattern could be several bits in length and the actual bit position to be deleted, or to have the overflow bit inserted could be identified by the end of the control code sequence.

In each of these cases, it will be appreciated that the diagrams are highly schematic and only the parts relevant to the stuff control system are indicated. Associated DTE and DSU control leads are not shown, but they will be understood to be like those shown in the aforementioned application to which this system is applicable. The system of FIG. 4 is applicable for DSU to DTE connections particularly at data rates used in digital data networks derived from PCM systems such as 56 kb/64 kb or multiples thereof, e.g., 128 kb, 256 kb. However, it may also be used for other data rates. One restriction is that the transmit and receive clock from the DSU must be the same frequency derived from the same source but not necessarily in the same phase.

The invention has been described in terms of two embodiments and methods applicable to those embodiments. It will be understood by those skilled in the art that these systems may be modified in various ways which will occur to one skilled in the art. Modifications may include additions to or deletions from the system or modification of various parts of the system shown for various purposes. All such modifications within the scope of the claims are intended to be within the scope and spirit of the present invention.

I claim:

1. A switch system for interconnecting by high speed transmission line first and second data handling equipments each having equipment interfaces where the equipments to be connected each can be operated from a rate derived from a system clock which does not require a separate high speed transmission line so that such a tranmission line, instead, can be used to carry a stuff control code signal, comprising:

means giving access to the system clock at at least one of the equipment interfaces;

a stuffing pattern generator controlled by the system clock which outputs a stuff control code signal onto a first high speed line;

an input buffer register allowing adjustment of data output rate relative to data input from said first equipment, having a write terminal triggered by a clock signal derived from the system clock permitting data from the first equipment into the input buffer register and a read clock terminal operated by the stuffing pattern generator allowing output of data and stuff bits onto a second high speed line from the buffer register; and an output buffer register in the second equipment interface for receiving the data and stuff bits from the second high speed line and having an input write terminal triggered by the stuff control code signal received on the first high speed line so that the buffer deletes the stuff bits and passes only valid data into the receiving equipment and having a read terminal operated by a clock derived from the system clock so that data is output at the correct system rate for the second equipment.

2. The system of claim 1 in which the second equipment interface is also provided with a second stuff control, a second stuffing pattern generator and means to transmit data including a second input buffer register for allowing adjustment of data output rate relative to data input from the second equipment and whose write trigger is obtained from the system clock and whose read trigger is controlled by a second stuff control code signal from a second stuffing pattern generator to generate, a third high speed line over which an input signal from the second equipment is transmitted and applied to the write trigger of a second output buffer register to control the data rate output of the data bits and the stuff bits of the stuff control signal onto a fourth high speed line, a second input buffer register at the first equipment interface into which the data and stuff signals on the fourth high speed line is fed but from which stuff bits are deleted by the stuff control signal applied to its write trigger, whose data rate input to the first equipment is controlled by data rate read trigger derived from the system clock.

3. The system of claim 2 in which the first and second equipments are DTE's.

4. The switching system of claim 1 in which one of the interface circuits is a DSU interface having a system clock and the other is a DTE interface, read and write data rate clock signals being generated at the DTE equipment through the stuff control code signal, a phase lock oscillator receiving the stuff control code signal from the first high speed line and from that signal deriving a data rate clock for the read terminal of the output buffer register.

5. The switching system of claim 4 in which the stuffing pattern generator is subject to control by an underflow indicator from the buffer register in order to insert additional stuffing bits where the buffer output rate exceeds the data bit rate unless selected data elements are omitted and stuffing bits added.

6. The switching system of claim 2 in which one of the interface circuits is a DSU interface having a system clock and the other is a DTE interface, read and write data rate clock signals being generated at the DTE equipment through the stuff control code signal, a phase lock oscillator receiving the stuff control code signal from the first high speed line and from that signal deriving a data rate clock for the read terminal of the output buffer register.

7. The switching system of claim 6 in which the stuffing pattern generator is subject to control by an underflow indicator from the buffer register in order to insert additional stuffing bits where the buffer output rate exceeds the data bit rate unless selected data elements are omitted and stuffing bits added.

8. The method of modifying bit frequency in data switching between first and second data equipments on one or more transmission lines where the data rate is a rational fraction of the transmission path rate in an equipment switching system comprising:

receiving data from the first equipment to be transmitted into a buffer register;

generating from the system clock which is common to the equipment to be connected a stuff control signal for transmission to the second equipment on a separate high speed transmission line from the data;

using the stuff control signal to trigger said buffer register to receive data from the first equipment and to allow passage of data bits only during a period coded by the stuff control signal for transmitting data;

using the stuff control signal at the second equipment interface to delete all signal information during the stuff period and retain only valid data; and reestablishing the original frequency of the data bit information to that in the first equipment.

9. The method of claim 8 in which the same method is used to transmit data in the opposite direction, from the second to the first equipment.

10. The method of claim 8 in which the stuff control signal may be modified from time to time to add additional stuffing bits, where the output rate from a buffer register exceeds the input rate, and the data and stuff control signal is accordingly modified to the output rate.

11. The method of claim 10 in which the stuff control signal pattern may be modified from time to time to eliminate stuffing and substitute data bits, where room may be needed in the data signal for additional data, and the data and stuff control signal is accordingly modified.

12. the method of claim 8 in which the stuff control signal pattern is modified from time to time to either add stuffing bits or eliminate stuffing bits, where the input data rate is less than or greater than the output rate from a buffer register, and the data and stuff control signal is accordingly modified.

* * * * *